United States Patent [19]

Furuhashi et al.

[11] 3,881,368
[45] May 6, 1975

[54] CONTROL DEVICE FOR AUTOMATIC TRANSMISSION IN AUTOMOBILES

[75] Inventors: Toshio Furuhashi, Katsuta; Takesi Kinosita, Hitachi, both of Japan

[73] Assignee: Hitachi, Ltd.

[22] Filed: July 6, 1973

[21] Appl. No.: 376,970

[30] Foreign Application Priority Data
July 12, 1972 Japan.................. 47-69077

[52] U.S. Cl. .................. 74/866; 74/846; 74/752 D
[51] Int. Cl. ...................... B60k 21/02; F16h 3/74
[58] Field of Search .......... 74/866, 846, 869, 752 D

[56] References Cited
UNITED STATES PATENTS

| | | | |
|---|---|---|---|
| 3,628,642 | 12/1971 | Ravenel | 74/866 X |
| 3,640,156 | 2/1972 | Mori et al. | 74/752 D X |
| 3,684,066 | 8/1972 | Kubo et al. | 74/866 X |
| 3,713,351 | 1/1973 | Sakakibara et al. | 74/866 X |
| 3,732,755 | 5/1973 | Beig et al. | 74/866 |

*Primary Examiner*—Samuel Scott
*Assistant Examiner*—P. S. Lall
*Attorney, Agent, or Firm*—Craig & Antonelli

[57] ABSTRACT

In an automobile equipped with an automatic transmission, a downshift is instructed on a downward slope when output signals appear simultaneously from a slope sensor, vehicle speed sensor, fully-closed throttle position sensor and foot brake actuation sensor so that the engine brake effect can be effectively utilized on the downward slope.

13 Claims, 5 Drawing Figures

CONTROL DEVICE FOR AUTOMATIC TRANSMISSION IN AUTOMOBILES

BACKGROUND OF THE INVENTION

This invention relates to control devices for automatic transmissions in automotive vehicles and more particularly to a control device of the kind above described which can effectively apply the engine brake when the vehicle is running on a downward slope.

In an automatic transmission in an automotive vehicle, the running speed of the vehicle and the opening of the throttle valve are generally detected for changing the transmission gear combination. In most cases, hydraulic power is used for changing the transmission gear combination and electrical computation is carried out for issuing the gear changing instructions. One of such devices is disclosed in, for example, U.S. Pat. No. 3448640 entitled "ELECTRICAL CONTROL FOR AUTOMATIC TRANSMISSION" of Robert E. Nelson, assigned to General Motors.

SUMMARY OF THE INVENTION

It is an object of the present invention to provide a novel and improved control device for an automatic transmission in an automotive vehicle, which can control the automatic transmission so that engine braking can be effectively applied when the vehicle is running on a downward slope which will require application of the brakes to the vehicle.

Another object of the present invention is to provide a control device of the kind above described in which a specific transmission gear combination for applying the engine brake is previously selected so that the automatic transmission can be shifted to this specific combination when all the conditions for applying the engine brake are satisfied.

Still another object of the present invention is to provide a control device of the kind above described in which the shift pattern is changed over to a higher speed shift pattern when all the conditions for applying the engine brake are satisfied so that the transmission gear combination can be suitably changed depending on the running speed of the vehicle.

Yet another object of the present invention is to provide a control device of the kind above described which can automatically compute the conditions for applying the engine brake.

The present invention is featured by the fact that a logical means is provided for making logical operation on a plurality of condition signals so as to detect whether the vehicle is running on a downward slope which will require application of the engine brake and the output of this logical means is utilized for automatically changing the transmission gear combination so as to obtain the desired effective engine brake effect.

Other objects, features and advantages of the present invention will be apparent from the following detailed description taken in conjunction with the accompanying drawings.

DESCRIPTION OF THE PREFERRED EMBODIMENTS

Figure 1:
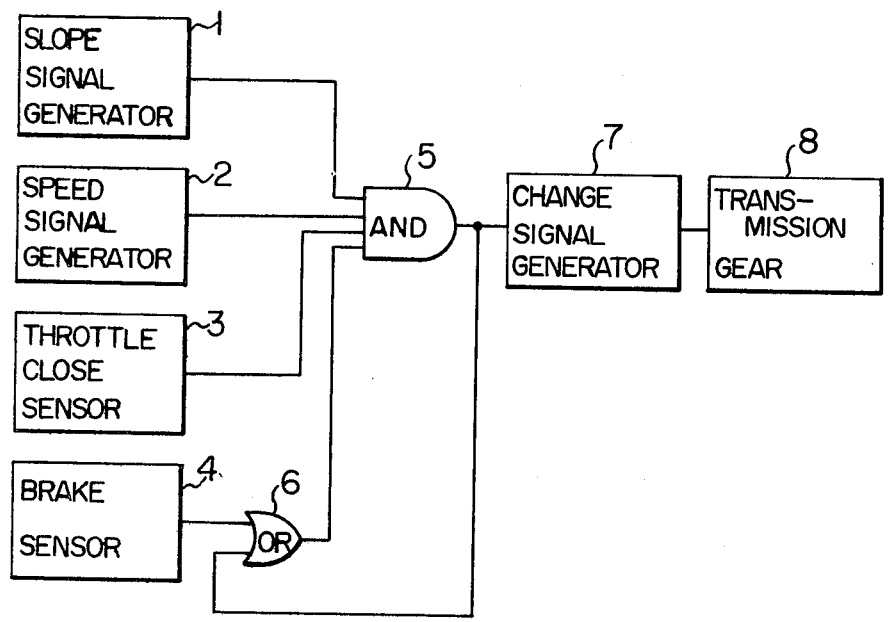
FIG. 1 is a block diagram showing the basic structure of a control device according to the present invention.

Referring to FIG. 1, a control device for an automatic transmission in an automotive vehicle according to the present invention comprises a slope signal generator 1, a vehicle speed signal generator 2, a fully-closed throttle position sensor 3, a foot brake actuation sensor 4, an AND gate 5, an OR gate 6, a gear change signal generator 7 and a three-speed transmission gear unit 8. The slope signal generator 1 detects the inclination of the vehicle body and generates a digital signal "1" when the vehicle is running on a downward slope whose inclination is greater than a predetermined value. The vehicle speed signal generator 2 detects the running speed of the vehicle and generates a digital signal 1 when the vehicle is running at a speed higher than a predetermined running speed. The fully closed throttle position sensor 3 generates a digital signal 1 when the throttle valve is in the full closed position. The foot brake actuation sensor 4 generates a digital signal 1 when the foot brake is actuated. A digital signal 1 appears from the AND gate 5 when all the inputs to the AND gate 5 are 1. In response to the application of the digital signal 1 to the gear change signal generator 7 from the AND gate 5, the gear change signal generator 7 applies a gear change signal to the transmission gear unit 8 so as to establish a gear combination which is effective for applying the engine brake. The output of the foot brake actuation sensor 4 and the output of the AND gate 5 are applied to the OR gate 6. The function of the OR gate 6 is such that, even when "0" appears from the foot brake actuation sensor 4 after the appearance of the digital signal 1 from the AND gate 5, the input signal 1 can be continuously applied to the AND gate 5 unless the other signals applied from the slope signal generator 1, vehicle speed signal generator 2 and full-closed throttle position sensor 3 are changed from 1 to 0.

In the control device having a structure as above described, the output of the slope signal generator 1 is 0 and the output of the AND gate 5 is also 0 when the vehicle is running on a flat road or a road having a small inclination. In such a running state therefore, the gear change signal generator 7 acts to establish a suitable gear combination in the transmission gear unit 8 on the basis of signals including a separately obtained signal representative of the running speed of the vehicle (an analog quantity representative of the running speed) and a signal representative of the opening of the throttle valve (an analog quantity representative of the opening of the throttle valve). Further, when the running speed of the vehicle is lower than the predetermined setting or when the throttle valve is in the open position or when the brake pedal is not actuated in spite of the fact that the vehicle is running on a road having an inclination greater than the predetermined setting, the output of the AND gate 5 is 0 and the gear change signal generator 7 acts to establish a suitable gear combination in the transmission gear unit 8 according to an ordinary shift pattern.

However, in the state in which all the output signals of the slope signal generator 1, vehicle speed signal generator 2, full-closed throttle position sensor 3 and foot brake actuation sensor 4 are 1, a digital signal 1 appears from the AND gate 5 and the gear change signal generator 7 generates a gear change signal for establishing a gear combination which is suitable for applying the engine brake. Once 1 has appeared from the AND gate 5, the braking signal is continuously applied by the action of the OR gate 6 even when the actuation of the foot brake is ceased. Such engine brake pattern is released when 0 appears from anyone of the slope signal generator 1, vehicle speed signal generator 2 and full-closed throttle position sensor 3.

Figure 3:
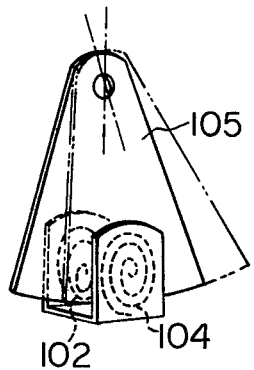
FIG. 3 is a schematic perspective view of a slope sensor employed in the control device.
Figure 2:
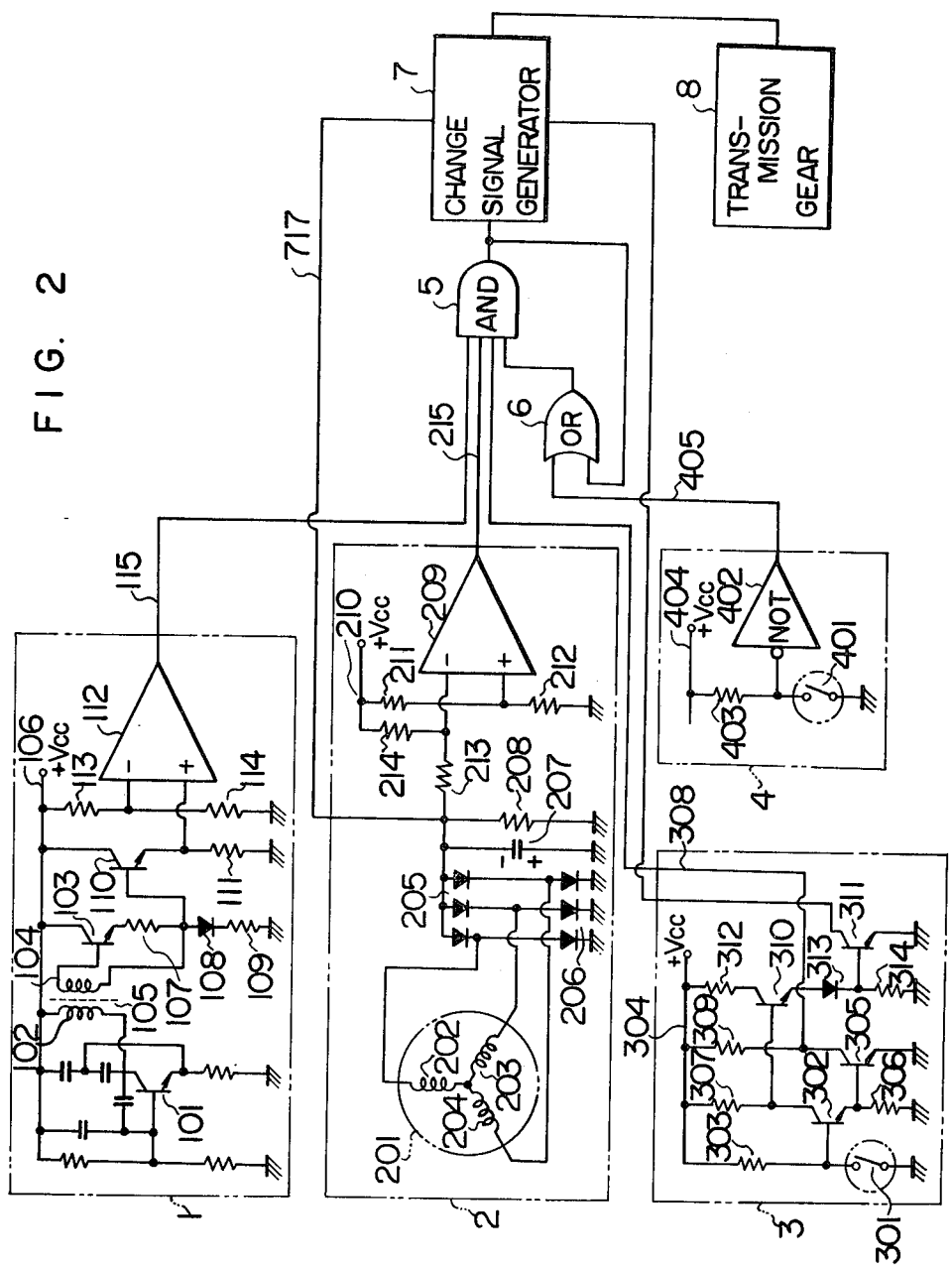
FIG. 2 is an electrical connection diagram of condition signal generators in the control device according to the present invention.

A practical circuit for generating these condition signals will be described with reference to FIG. 2. The slope signal generator 1 comprises a Colpitts oscillator and a receiver. The Colpitts oscillator includes an npn transistor 101, a coil 102, a plurality of resistors and a plurality of capacitors, and the receiver includes an npn transistor 103 and a receiving coil 104. The oscillator oscillates with a frequency of several megahertz and the coil 102 serves also as a transmitting coil. The receiving coil 104 is disposed opposite to the transmitting coil 102 as shown in FIG. 3 and a shielding plate 105 which obstructs propagation of the electromagnetic wave is interposed between these two coils 102 and 104. More precisely, the shielding plate 105 of conductive material is swingably suspended in the space between the coils 102 and 104 so that the electromagnetic wave cannot propagate from the transmitting coil 102 toward the receiving coil 104 when the vehicle body is not inclined. When the vehicle body is inclined, both these two coils 102 and 104 are also inclined together with the vehicle body, but the shielding plate 105 swings by the gravity without following the inclination of the vehicle body. Thus, the action of the shielding plate 105 obstructing the propagation of the electromagnetic wave is reduced and a voltage proportional to the inclination of the vehicle body is induced in the receiving coil 104. The npn transistor 103 is connected at the base thereof to one end of the receiving coil 104 and at the collector thereof to a constant-voltage power supply line 106 connected to the positive side of a power supply. The emitter of the transistor 103 is grounded through a resistor 107, a diode 108 and another resistor 109, and the other end of the receiving coil 104 is connected to the connection point between the resistor 107 and the diode 108. An npn transistor 110 is connected at the base thereof to the connection point between the resistor 107 and the diode 108 and at the collector thereof to the power supply line 106, while the emitter thereof is grounded through a resistor 111. A reference voltage obtained by dividing the line voltage by voltage dividing resistors 113 and 114 is applied to the input terminal (−) of a comparator 112 and the emitter of the transistor 110 is connected to the input terminal (+) of the comparator 112. An output lead 115 leads out from the output terminal of the comparator 112 to be connected to the AND gate 5.

In the slope signal generator 1 having such a structure, an electromagnetic wave having a constant magnitude is transmitted from the transmitting coil 102 to be received by the receiving coil 104. However, when the vehicle is running on a flat road, any substantial voltage is not induced in the receiving coil 104 due to the fact that the shielding plate 105 obstructs propagation of the electromagnetic wave. In such a state, the transistor 103 is non-conducting and the transistor 110 is also non-conducting. Thus, the emitter potential of the transistor 110, hence the potential at the input terminal (+) of the comparator 112 is equal to the ground potential. Therefore, the input applied to the input terminal (−) of the comparator 112 is larger than the input applied to the input terminal (+) of the comparator 112 and 0 appears on the output lead 115. On the other hand, when the vehicle is running on a downward slope, the position of the shielding plate 105 is displaced relative to the position of the coils 102 and 104 and the electromagnetic wave transmitted from the transmitting coil 102 is received by the receiving coil 104 thereby inducing a voltage in the receiving coil 104. The magnitude of this induced voltage is proportional to the relative displacement of the positions of the shielding plate 105 and coils 102 and 104, hence the degree of inclination of the vehicle body. The voltage induced in the receiving coil 104 in this manner is rectified and amplified by the transistor 103 and is further amplified by the transistor 110 to be applied to the input terminal (+) of the comparator 112. Thus, by arranging in such a manner that 1 is generated from the comparator 112 to appear on the output lead 115 when a voltage corresponding to a predetermined inclination of the vehicle body is applied to the input terminal (+) of the comparator 112, a slope signal 1 can be produced when the vehicle is running on a downward slope which will require application of the engine brake.

The vehicle speed signal generator 2 includes a tachogenerator 201 which is driven in synchronous relation with the road engaging wheels of the vehicle. The voltage generating coils 202, 203 and 204 of the tachogenerator 201 are connected to rectifier groups 205 and 206 so as to provide a negative potential relative to the ground potential. In the present invention, the polarity which is negative relative to the ground potential is selected in relation to the polarity of the signal applied to the gear change signal generator 7. However, this is not an essential condition and any desired polarity may be employed as required. The negative voltage appearing at the common-connected anodes of the rectifier group 205 is smoothed by a capacitor 207 and a resistor 208 which act to eliminate ripples. A reference voltage obtained by dividing the line voltage by voltage dividing resistors 211 and 212 are applied to the input terminal (+) of a comparator 209 from a constant-voltage power supply line 210 connected to the positive side of the power supply. The input terminal (−) of the comparator 209 is connected to the anodes of the rectifier group 205 through a resistor 213 and to the power supply line 210 through a resistor 214 so that a variable input voltage can be applied to this input terminal. An output lead 215 leads out from the output terminal of the comparator 209 to be connected to the AND gate 5.

In the vehicle speed signal generator 2 having such a structure, the potential at the anodes of the rectifier group 205 is substantially equal to the ground potential and a voltage obtained by dividing the line voltage by the resistors 213 and 214 is applied to the input terminal (−) of the comparator 209 when the vehicle is at rest and is not running. In this state therefore, 0 appears on the output lead 215 of the comparator 209 when the resistance values of the resistors 211, 212, 213 and 214 are selected so that the potential at the input terminal (−) of the comparator 209 is higher than the potential at the input terminal (+) thereof. In the state in which the vehicle is running, the anode potential of the rectifier group 205 is reduced to a level lower than the ground potential depending on the running speed of the vehicle. As a result, the potential at the input terminal (−) of the comparator 209 is also reduced correspondingly. Therefore, by arranging in such a manner that the potential at this input terminal (−) of the comparator 209 is reduced to a level lower than the potential at the input terminal (+) of the comparator 209 at a high speed which will require application of the engine brake, 1 appears on the output lead 215 of the comparator 209 at a running speed which requires application of the engine brake.

The full-closed throttle position sensor 3 is so constructed that its output signal is controlled by a switch 301 which is closed when the throttle valve (not shown) is in the idling position. The switch 301 is grounded at one end, thereof and is connected at the other end thereof to the base of an npn transistor 302 and to a constant-voltage power supply line 304 similar to the lines 106 and 210 through a resistor 303. The emitter of the transistor 302 is connected to the base of another npn transistor 305 and is grounded through a resistor 306, and the collector of the transistor 302 is connected to the power supply line 304 through a resistor 307. The emitter of the transistor 305 is grounded directly and the collector thereof is connected to an output lead 308, which is connected to the AND gate 5, and to the power supply line 304 through a resistor 309. A pair of npn transistors 310 and 311 are provided for directly applying a signal to the gear change signal generator 7. The transistor 310 is connected at the base thereof to the collector of the transistor 302 and at the collector thereof to the power supply line 304 through a resistor 312. A diode 313 is connected in the forward direction to the emitter of the transistor 310, and the cathode of this diode 313 is connected to the base of the transistor 311 and is grounded through a resistor 314. The transistor 311 is grounded at the emitter thereof and is connected at the collector thereof to the gear change signal generator 7.

In the full-closed throttle position sensor 3 having a structure as above described, the switch 301 is in the closed position when the throttle valve is in the idling or full-closed position, and the transistors 302 and 305 are non-conducting resulting in the appearance of 1 on the output lead 308. The switch 301 is in the open position when the throttle valve is in the open position, and the transistors 302 and 305 are conducting resulting in the appearance of 0 on the output lead 308. Further, the transistors 310 and 311 are conducting in the closed position of the switch 301 and are non-conducting in the open position of the switch 301.

The foot brake actuation sensor 4 includes a switch 401 which is closed in response to the depression of the brake pedal (not shown). This switch 401 may be a switch commonly employed for energizing the brake lamps. This brake switch 401 is grounded at one end thereof and is connected at the other end thereof to the input terminal of a NOT gate 402 and to a constant-voltage power supply line 404 similar to the lines 106, 210 and 304 through a resistor 403. An output lead 405 leads out from the output terminal of the NOT gate 402 to be connected to the OR gate 6.

In the foot brake actuation sensor 4 having a structure as above described, the switch 401 is closed in response to the depression of the brake pedal and the input voltage applied to the NOT gate 402 is equal to the ground potential or 0. Therefore, 1 appears on the output lead 405 of the NOT gate 402.

Figure 4:
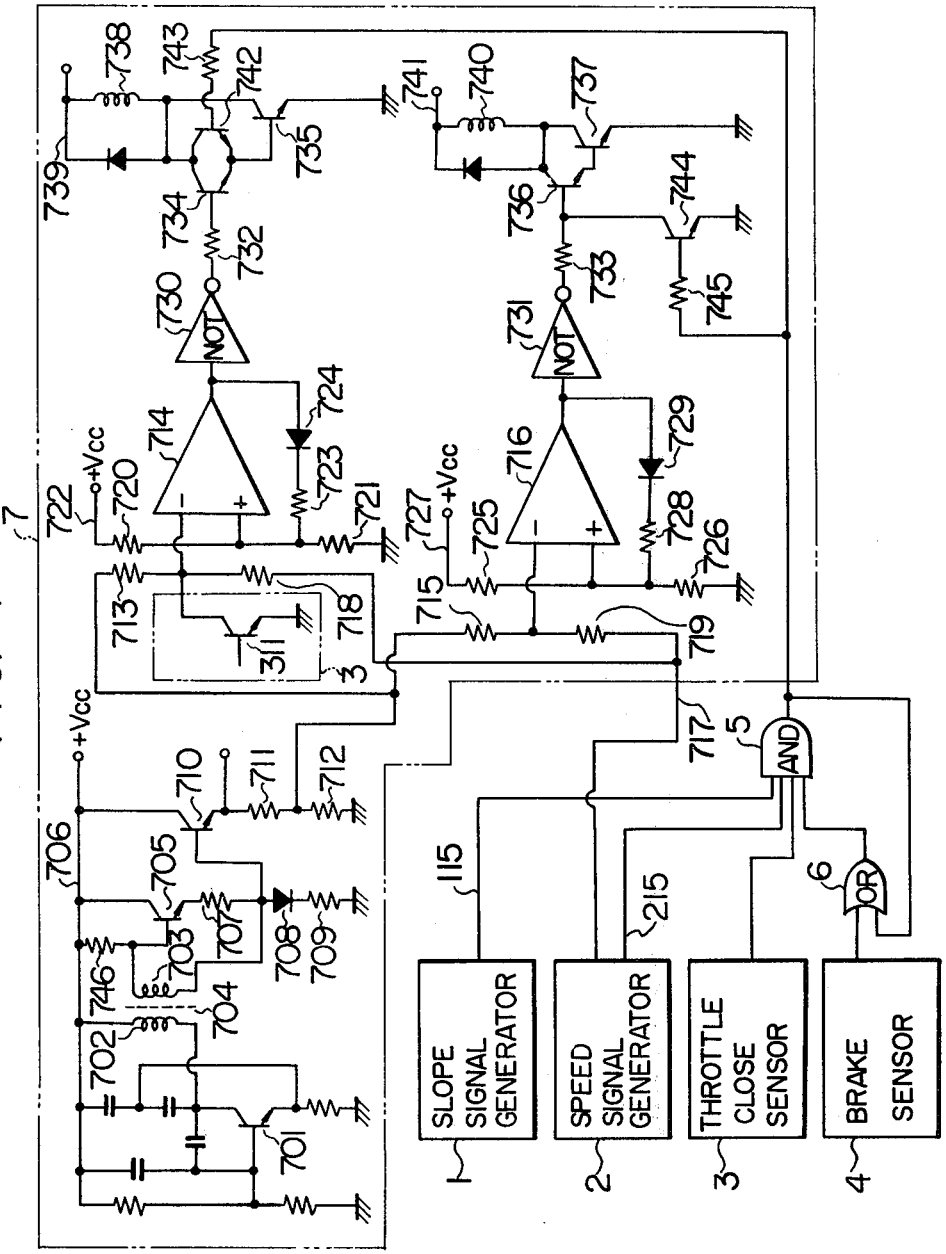
FIG. 4 is an electrical connection diagram of a gear change signal generator for applying the engine brake with a specific transmission gear combination.

A practical structure of the gear change signal generator 7 will be described with reference to FIG. 4. The arrangement shown in FIG. 4 is adapted for applying the engine brake with a specific transmission gear combination giving the second speed. The following table shows the relation between the three-speed transmission gear unit and the operating conditions of solenoid valves determining the gear combination:

| Transmission gear position | Solenoid valves | |
| --- | --- | --- |
| | SV1 (738) | SV2 (740) |
| I (1st speed) | O | O |
| II (2nd speed) | O | X |
| III (3rd speed) | X | X |

O energized
X deenergized

Referring to FIG. 4, the gear change signal generator 7 is so constructed as to control the current supplied to the solenoid valves on the basis of the electrical signals representative of the throttle valve opening and vehicle speed. The opening of the throttle valve is detected in a manner similar to that described with reference to the slope sensor. More precisely, an npn transistor 701, a transmitting coil 702, a plurality of capacitors and a plurality of resistors constitute a Colpitts oscillator, and a shielding plate 704 is provided for controlling the propagation of the electromagnetic energy from the coil 702 toward a receiving coil 703. This shielding plate 704 is arranged for interlocking operation with the throttle valve so that a voltage corresponding to the opening of the throttle valve can be induced in the receiving coil 703. An npn transistor 705 is connected at the collector thereof to a constant-voltage power supply line 706 similar to the line 106 and at the base thereof to one end of the receiving coil 703. The emitter of the transistor 705 is grounded through a resistor 707, a diode 708 and another resistor 709 arranged in this order, and the other end of the receiving coil 703 is connected to the connection point between the resistor 707 and the diode 708. An npn transistor 710 is connected at the collector thereof to the power supply line 706 directly and at the base thereof to the connection point between the resistor 707 and the diode 708 is grounded at the emitter thereof through resistors 711 and 712. A biasing resistor 746 is provided for maintaining the output signal level above a certain level. It will be seen that a voltage having a level corresponding to the opening of the throttle valve appears on the emitter circuit of the transistor 710 in a manner similar to that described with reference to the slope sensor.

The connection point between the resistors 711 and 712 is connected to the input terminal (−) of a comparator 714 through a resistor 713 and to the input terminal (−) of another comparator 716 through a resistor 715. A lead 717 leading out from the anodes of the rectifier group 205 in the vehicle speed signal generator 2 shown in FIG. 2 is connected to the input terminal (−)

of the comparator 714 through a resistor 718 and to the input terminal (−) of the comparator 716 through a resistor 719. The comparator 714 controls the solenoid valve SV1. A reference voltage obtained by dividing the voltage of a constant-voltage power supply line 722 by resistors 720 and 721 is applied to the input terminal (+) of the comparator 714, and a feedback circuit consisting of a resistor 723 and a diode 724 is provided for the comparator 714. The comparator 716 controls the solenoid valve SV2. A reference voltage obtained by dividing the voltage of a constantvoltage power supply line 727 by resistors 725 and 726 is applied to the input terminal (+) of the comparator 716 and a feedback circuit consisting of a resistor 728 and a diode 729 is provided as in the case of the comparator 714. Further, the input terminal (−) of the comparator 714 is grounded through the transistor 311 in the full-closed throttle position sensor 3.

A NOT gate 730 is connected at the input terminal thereof to the output terminal of the comparator 714, and another NOT gate 731 is connected at the input terminal thereof to the output terminal of the comparator 716. The output terminal of the NOT gate 730 is connected to the base circuit of a Darlington circuit consisting of a pair of npn transistors 734 and 735 through a resistor 732, and the output terminal of the NOT gate 731 is connected to the base circuit of another Darlington circuit consisting of a pair of npn transistors 736 and 737 through another resistor 733. The emitter circuit of the transistors 734 and 735 is grounded and the collector circuit thereof is connected to a power supply line 739 through the solenoid 738 of the solenoid valve SV1. Similarly, the emitter circuit of the transistors 736 and 737 is grounded and the collector circuit thereof is connected to another power supply line 741 through the solenoid 740 of the solenoid valve SV2. The emitter and collector of the transistor 734 are connected in parallel with the emitter and collector of another npn transistor 742 and the base of the transistor 742 is connected to the output terminal of the AND gate 5 through a resistor 743. The collector and emitter of another npn transistor 744 are connected between the base of the transistor 736 and ground and the base of the transistor 744 is connected to the output terminal of the AND gate 5 through a resistor 745.

In the gear change signal generator 7 having a structure as above described, the input termnal (−) of the comparator 714 is grounded and 1 appears from the comparator 714 due to the fact that the transistor 311 in the full-closed throttle position sensor 3 is conducting in the state in which the vehicle is at rest on a flat road and the accelerator pedal (not shown) is not depressed. Further, in this state, the potential at the input terminal (−) of the comparator 716 is low and 1 appears from the comparator 716 due to the fact that the output voltage of the transistor 710 representative of the opening of the throttle valve is in the lowest level. These two output signals of the comparators 714 and 716 are inverted by the respective NOT gates 730 and 731 and 0 appears at the output terminal of each of these gates 730 and 731. Thus, the transistors 734, 735 and 736, 737 are non-conducting and the solenoids 738 and 740 are in the deenergized state. As a result, the transmission gear combination is in the "III" position.

In response to the depression of the accelerator pedal, the throttle valve is opened thereby increasing the emitter potential of the transistor 710 and cutting off the transistor 311. As a result, the voltages applied to the input terminals (−) of the comparators 714 and 716 exceed those applied to the input terminals (+) of the comparators 714 and 716 and the output of each of these two comparators 714 and 716 is inverted to 0. The NOT gate 730 and 731 deliver 1 in response to the application of 0, and therefore, the transistors 734, 735 and 736, 737 conduct to energize the solenoids 738 and 740. Therefore, the transmission gear unit is shifted to the "I" position and the vehicle starts to run. With the increase in the running speed of the vehicle, the potential on the output lead 717 of the vehicle speed signal generator 2 is rendered negative relative to the ground potential and the voltages applied to the input terminals (−) of the comparators 714 and 716 are reduced. By selecting the circuit constants such that the voltage applied to the input terminal (−) of the comparator 716 is initially reduced to a level lower than the voltage applied to the input terminal (+) of this comparator 716 with the increase in the running speed of the vehicle, 1 appears from the comparator 716 and 0 appears from the NOT circuit 731 with the result that the transistors 736 and 737 are cut off to deenergize the solenoid 740 thereby shifting the transmission gear combination to the "II" position. As the running speed of the vehicle increases further, the voltage applied to the input terminal (−) of the comparator 714 is also reduced to a level lower than the voltage applied to the input terminal (+) of this comparator 714 and 1 appears from the comparator 714. As a result, the transistors 734 and 735 connected to the comparator 714 through the NOT gate 730 are also cut off to deenergize the solenoid 738 thereby shifting the transmission gear combination to the III position. Such an upshift in the transmission gear combination occurs at a higher running speed of the vehicle with a greater opening of the throttle valve.

The above description has referred to the shift of the transmission gear combination when the vehicle is running on a flat road. When the vehcle is running on a downward slope, the throttle valve is restored to the full-closed position (idling position) by the force of the return spring in response to the release of the force imparted to the accelerator pedal. In this case, the signal representative of the opening of the throttle valve is in its lowest level, and the voltages applied to the input terminals (−) of the comparators 714 and 716 are lower than those applied to the input terminals (+) of these comparators. Thus, the transmission gear combination is in the III position.

When the brake pedal is actuated in the running conditions in which the inclination of the vehicle body is more than the predetermined setting, the running speed of the vehicle is higher than the predetermined setting and the throttle valve is in the full-closed position, the AND gate 5 delivers a digital signal 1 as described with reference to FIGS. 1 and 2. The transistors 742 and 744 are turned on with the result that the solenoid 738 is necessarily energized and the solenoid 740 is necessarily deenergized thereby shifting the transmission gear combination to the II position. In this position, the engine brake can be effectively applied.

Figure 5:
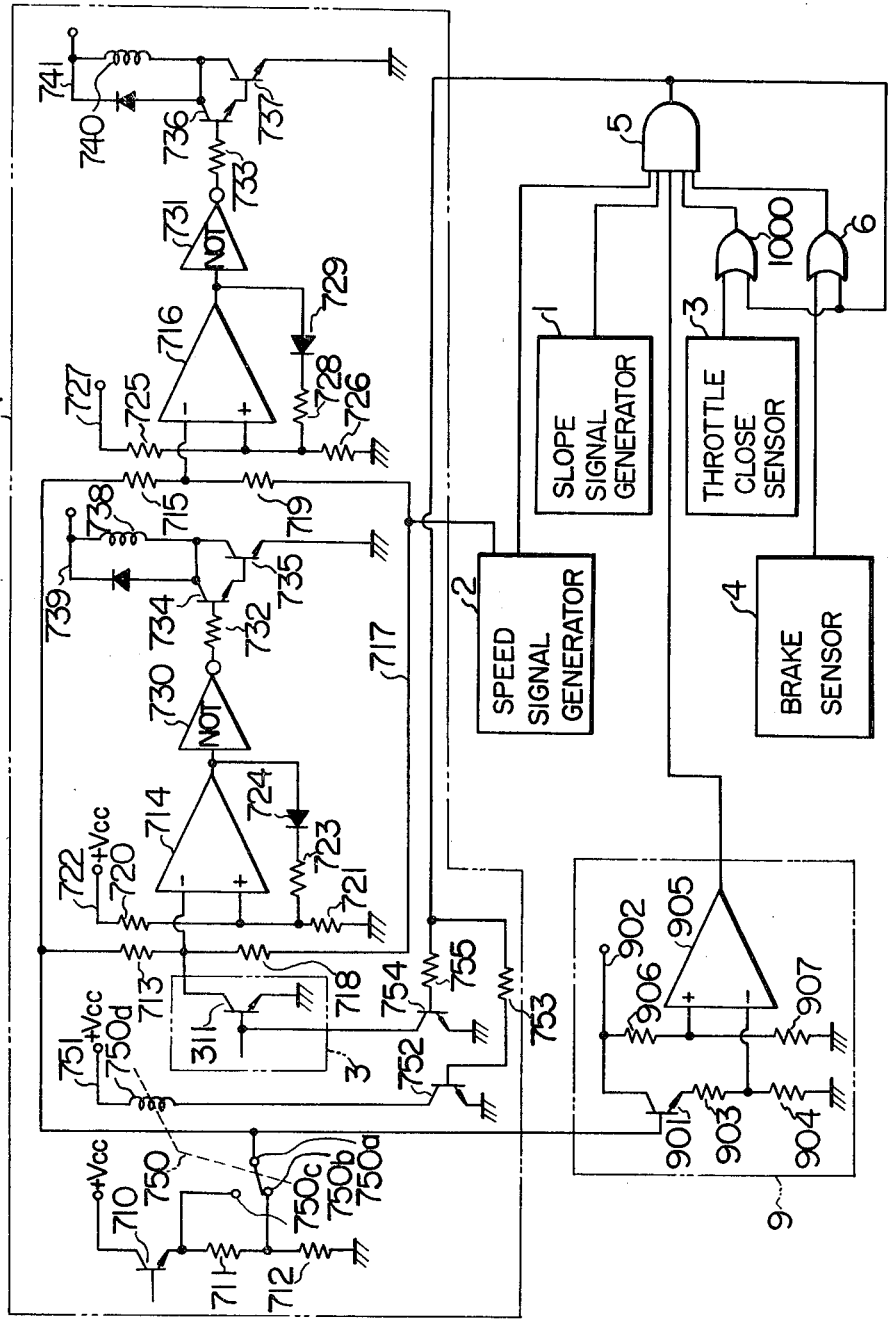
FIG. 5 is an electrical connection diagram of a modification of the gear change signal generator for applying the engine brake according to a higher speed shift pattern.

FIG. 5 shows a modification of the gear change signal generator 7 shown in FIG. 4. In this modification, the shift point of the transmission gear unit is shifted toward a higher speed side when all the conditions for applying the engine brake are established. In order to realize such a shift of the shift point, the signal level applied from the throttle valve opening sensor to the comparators 714 and 716 may be increased relative to the opening of the throttle valve or the signal level applied from the vehicle speed sensor to the comparators 714 and 716 may be decreased relative to the speed of the vehicle.

In FIG. 5, the shift of the shift point is realized by varying the output signal of the throttle valve opening sensor. The output of the transistor 710 whose emitter potential increases with the increase in the opening of the throttle valve is derived from the voltage dividing resistor 712 when the vehicle is running on a flat road, while such output is directly obtained from the emitter when the vehicle is running on a downward slope which will require application of the engine brake. This can be attained by connecting the common terminal of the resistors 713 and 715 to a movable contact 750a of an electromagnetic relay 750, connecting the resistor 712 and the emitter of the transistor 710 to respective stationary contacts 750b and 750c of the electromagnetic relay 750, and actuating this movable contact 750a by an electromagnetic coil 750d which is controlled by the output of the AND gate 5. The movable contact 750a of the electromagnetic relay 750 is normally in contact with the stationary contact 750b, and the electromagnetic coil 750d is connected at one end thereof to a power supply line 751 and is grounded at the other end thereof through the collector and emitter of an npn transistor 752. The base of the transistor 752 is connected to the output terminal of the AND gate 5 through a resistor 753. The base of the transistor 311 is grounded through the collector and emitter of an npn transistor 754, and the base of this transistor 754 is connected to the output terminal of the AND gate 5 through a resistor 755. Further, in the case of the shift according to such a higher speed shift pattern, this pattern must be maintained even when the throttle valve is slightly opened. For this purpose, the output of the full-closed throttle sensor 3 is applied to the AND gate 5 through an OR gate 1000 to which another input is applied from the AND gate 5. A clear signal appears when the opening of the throttle valve exceeds a predetermined setting so as to cease the logical operation by the AND gate 5. This clear signal is produced by a clear signal generator 9. This clear signal generator 9 includes an npn transistor 901 and a comparator 905. The transistor 901 is connected at the collector thereof to a power supply line 902 and at the base thereof to the movable contact 750a of the electromagnetic relay 750, and the emitter of this transistor 901 is grounded through voltage dividing resistors 903 and 904. A reference voltage is applied to the input terminal (+) of the comparator 905 from the power supply line 902 through voltage dividing resistors 906 and 907, and the voltage obtained by the voltage dividing resistors 903 and 904 is applied to the input terminal (−) of the comparator 905. The output of the comparator 905 is the clear signal which is applied to the AND gate 5.

In the gear change signal generator 7 having a structure as above described, the output of the AND gate 5 is 0, the transistors 752 and 754 are nonconducting and the movable contact 750a of the electromagnetic relay 750 is in contact with the stationary contact 750b when the vehicle is running under the conditions which will not require application of the engine brake. Therefore, the signal level applied to the comparators 714 and 716 is relatively low compared with the opening of the throttle valve, and the operating point which is determined relative to the vehicle speed responsive signal delivered from the vehicle speed sensor 2 is set at a relatively low vehicle speed.

On the other hand, when all the conditions for applying the engine brake are satisfied, 1 appears from the AND gate 5 and the transistors 752 and 754 conduct simultaneously as described above. In response to the conduction of the transistor 752, current flows through the electromagnetic coil 750d of the electromagnetic relay 750 and the movable contact 750a is disengaged from the stationary contact 750b to engage now with the stationary contact 750c. Due to the fact that the transistor 710 is indirectly controlled by the biasing resistor 746 so that the emitter voltage can be maintained at a certain level even when the opening of the throttle valve is zero, the engagement of the movable contact 750a with the stationary contact 750c results in application of a relatively large positive voltage to each of the input terminal (−) of the comparators 714 and 716. In such a state, the comparator 714 continues to deliver 0 unless the output voltage (proportional to the speed of the vehicle) of the vehicle speed sensor 2 takes a considerably large negative value. Consequently, the transmission gear combination remains in the II position in spite of a considerable increase in the speed of the vehicle. The effect of the engine brake is considerably great when the transmission gear combination is in the II position and the opening of the throttle valve is zero.

When the accelerator pedal is depressed to open the throttle valve during running of the vehicle with the application of the engine brake in the manner above described, the engine develops its output and the vehicle is accelerated. Even in such a case, any shift in the shift point does not occur due to the fact that 1 is continuously delivered from the AND gate 5 by the action of the OR gate 1000 although the output signal of the full-closed throttle position sensor 3 is changed from 1 to 0. However, with the increase in the opening of the throttle valve, the emitter voltage of the transistor 710 is increased, and this voltage tends to bias the transistor 901 in the clear signal generator 9 toward the conducting state thereby increasing the voltage applied to the input terminal (−) of the comparator 905. When the throttle valve is opened to such an extent that the voltage applied to the input terminal (−) of the comparator 905 exceeds the voltage applied to the input terminal (+) of the comparator 905, which voltage is determined by the voltage dividing resistors 906 and 907, the output signal of the comparator 905 is changed from 1 to 0 thereby clearing the AND conditions of the AND gate 5. As a result, 0 appears from the AND gate 5 and the transistors 752 and 754 are cut off. The movable contact 750a of the electromagnetic relay 750 is disengaged from the stationary contact 750c to engage now with the stationary contact 750b and the flat road running pattern is restored.

While two preferred embodiments of the present invention have been described by way of example, various changes and modifications may be made in the electrical network for computing the shift point of the transmission gear unit and the present invention is in no way limited to the specific embodiments above described.

We claim:

1. A control device for an automatic transmission in an automotive vehicle of the kind in which the running conditions of the vehicle are detected for controlling the combination of transmission gears, comprising a slope signal generator generating an output signal when the inclination of the vehicle body exceeds a predetermined setting, a vehicle speed signal generator generating an output signal when the running speed of the vehicle exceeds a predetermined setting, a full-closed throttle position sensor generating an output signal when the throttle valve is in the full-closed position, a foot brake actuation sensor generating an output signal in response to the actuation of the foot brake, an OR gate connected to said foot brake actuation sensor to receive a first input therefrom, an AND gate connected to said slope signal generator, said vehicle speed signal generator, said full-closed throttle position sensor and said OR gate to receive a plurality of inputs therefrom, circuit means for applying the output signal of said AND gate to said OR gate as a second input to the latter, and a gear change signal generator connected to said AND gate for controlling the transmission gears so as to establish a gear combination most suitable for braking of the engine depending on the output signal of said AND gate.

2. A device as claimed in claim 1, wherein said gear change signal generator delivers an output signal for establishing a specific transmission gear combination in response to the application of the output signal of said AND gate.

3. A device as claimed in claim 1, wherein means for sensing the opening of the throttle valve and generating an output signal representative of the opening of the throttle valve and means for generating an output signal representative of the speed of the vehicle are provided to apply their output signals to said gear change signal generator so that said gear change signal generator generates a signal for establishing a suitable transmission gear combination in response to the application of these signals, and said gear change signal generator generates a gear change signal for changing the gears at a higher vehicle speed in response to the application of the output signal of said AND gate.

4. An electric transmission gear control device for an automatic transmission in an automotive vehicle comprising:
   a. a gear change signal generator controlled by combinations of the signals from a throttle valve opening sensor for sensing the opening of a throttle valve and a vehicle speed signal generator for generating an output signal representative of the speed of the vehicle;
   b. a downhill sensor generating a first output signal when the inclination of the vehicle body exceeds a predetermined setting;
   c. an exceeding speed sensor generating a second output signal when the running speed of the vehicle exceeds a predetermined setting;
   d. a full-closed throttle position sensor generating a third output signal when the throttle valve is in the full-closed position;
   e. a foot brake actuation sensor generating a fourth output signal in response to the actuation of a foot brake;
   f. an OR gate receiving the fourth output signal from said foot brake actuation sensor as its first input signal and generating a fifth output signal; and
   g. an AND gate receiving the first, second third and fifth output signals from said downhill sensor, said exceeding speed sensor, said full-closed throttle position, sensor, and said OR gate, respectively and generating a resultant output signal, said resultant output signal being transmitted to said OR gate as its second input signal and to said gear change signal generator, so as to change its output signal to a predetermined lower gear signal irrespective of the combination of the signals from said throttle valve opening sensor and said vehicle speed signal generator.

5. An electric transmission gear control device for an automatic transmission in an automotive vehicle comprising:
   a. a gear change signal generator controlled by combinations of signals from a throttle valve opening sensor for sending the opening of a throttle valve and a vehicle speed signal generator having a tacho-generator generating a signal in response to the vehicle speed and rectifier means for rectifying the signal from the tachogenerator;
   b. a downhill sensor having
      a Colpitts oscillator,
      a first coil for receiving an oscillation signal from the Colpitts oscillator,
      a second coil magnetically coupled with the first coil,
      a shield plate disposed between the first and second coils for varying the oscillation signal to be transmitted therebetween in response to the inclination of the vehicle, and
      a first comparator comparing the modified signal from the second coil with a predetermined first reference signal and generating a first output signal when the magnitude of the modified signal exceeds that of the predetermined first reference signal;
   c. an exceeding speed sensor having a second comparator comparing the signal from the rectifier means with a predetermined second reference signal and generating a second output signal when the magnitude of the rectified signal exceeds that of the predetermined second reference signal;
   d. a full-closed throttle position sensor for generating a third output signal when a throttle valve is in a full-closed position;
   e. a foot brake actuation sensor generating a fourth output signal through a NOT gate in response to the actuation of a foot brake;
   f. an OR gate receiving the fourth signal from said foot brake actuation sensor as its first input signal and generating a fifth output signal; and
   g. an AND gate receiving the first, second third and fifth output signals from said downhill sensor, said exceeding speed sensor, a full-closed throttle position sensor, said OR gate respectively, and generating a resultant output signal, said resultant output signal being transmitted to said OR gate as its second input signal and to said gear change signal generator to change its output signal to a predetermined lower gear signal irrespective of the combinations of the signals from said throttle valve opening sensor and said vehicle speed signal generator.

6. A control device for an automatic transmission in an automotive vehicle comprising:
  first means, responsive to the inclination of the vehicle, for generating a first output signal upon the downhill inclination of the vehicle exceeding a predetermined slope;
  second means, responsive to the running speed of the vehicle, for generating a second output signal upon the speed of the vehicle exceeding a predetermined speed;
  third means, responsive to the position of throttle valve, for generating a third output signal upon the throttle valve being in its fully-closed position;
  fourth means, responsive to the actuation of the foot brake, for generating a fourth output signal upon the actuation of said foot brake;
  fifth means, responsive to the position of said throttle valve, for generating a fifth output signal representative of the degree of opening of said throttle valve;
  sixth means, responsive to the running speed of the vehicle, for generating a sixth output signal representative of the running speed of the vehicle;
  seventh means, coupled to said first, second, third and fourth means, for generating a seventh output signal in response to the simultaneous existence of said first, second, third and fourth output signals; and
  eighth means, coupled to said fifth, sixth and seventh means, for normally selecting the gears of said transmission in accordance with said fifth and sixth output signals and for selecting a prescribed gear of said transmission in response to said seventh output signal irrespective of said fifth and sixth output signals.

7. A control device according to claim 6, wherein said fourth means includes means, coupled to the output of said seventh means, for additionally generating said fourth output signal in response to said seventh output signal.

8. A control device according to claim 6, further including ninth means, coupled to said fifth, sixth, seventh and eighth means, for causing said eighth means to select said prescribed gear at a higher vehicle speed even though said throttle valve is closed.

9. A control device according to claim 8, wherein said ninth means comprises switching means, responsive to the generation of said seventh output signal, for shifting the level of the output of said fifth means.

10. A control device according to claim 9, wherein said third means includes means, coupled to the output of said seventh means, for additionally generating said third output signal in response to said seventh output signal.

11. A control device according to claim 10, further including tenth means, responsive to the output of said fifth means, for preventing said seventh means for generating said seventh output signal upon an increase in the level of said fifth output signal above a prescribed level.

12. A control device according to claim 11, wherein said fourth means includes means, coupled to the output of said seventh means, for additionally generating said fourth output signal in response to said seventh output signal.

13. A control device according to claim 12, wherein said seventh means comprises an AND gate and each of said third and fourth means includes an OR gate coupled between the output of said AND gate and a respective input thereof.

* * * * *